April 18, 1967 E. A. RUBIN 3,314,880
METHOD OF REMOVING A CONTAMINATING SUBSTANCE
FROM A LIQUID BY FLOTATION
Filed June 28, 1965 2 Sheets-Sheet 1
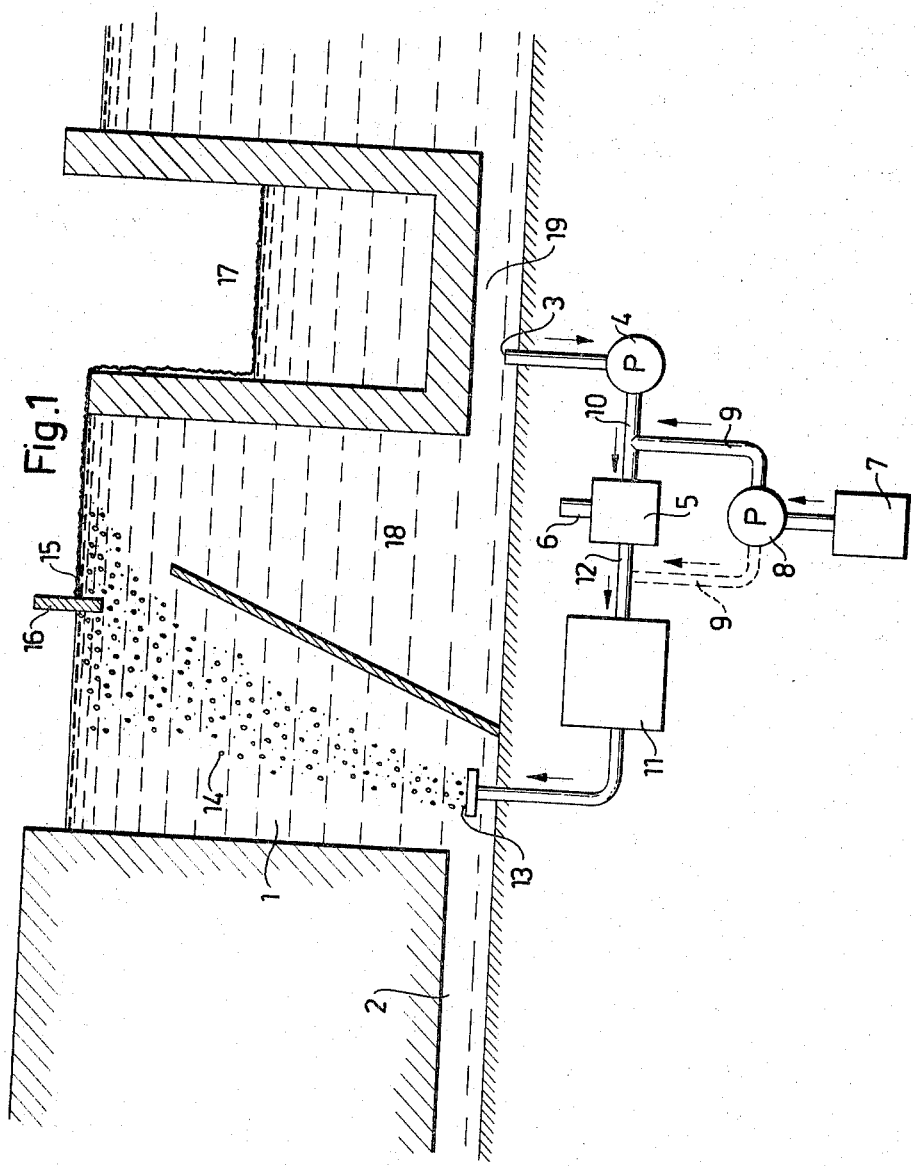
INVENTOR
Ernst Arne Rubin
BY Pierce, Scheffler & Parker
ATTORNEYS

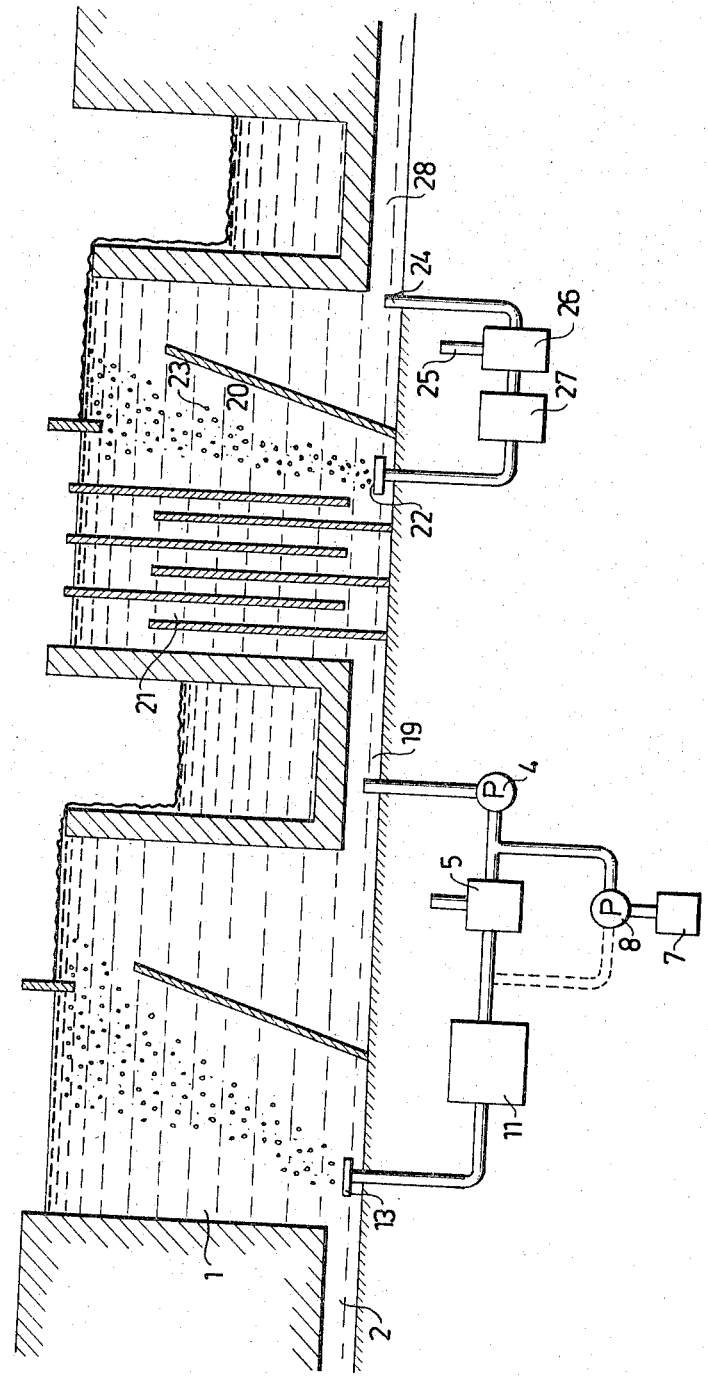

United States Patent Office 3,314,880
Patented Apr. 18, 1967

3,314,880
METHOD OF REMOVING A CONTAMINATING SUBSTANCE FROM A LIQUID BY FLOTATION
Ernst Arne Rubin, Lund, Sweden, assignor to AB Purac, Lund, Sweden, a company of Sweden
Filed June 28, 1965, Ser. No. 467,517
Claims priority, application Sweden, June 29, 1964, 7,894/64
1 Claim. (Cl. 210—44)

This application is a continuation-in-part of my application Ser. No. 436,724, filed Mar. 1, 1965.

The present invention refers to a method of flocculating at least certain substances existing in a contaminated quantity of liquid and by means of flotation causing the flocculated substances to accumulate on the liquid surface.

A method has earlier been suggested for purifying waste water containing proteinaceous substances by being first precipitated in special flocculation plants, whereupon the precipitate is flotated by means of air bubbles obtained from a water-air dispersion supplied to the precipitate. The flocculation plants are relatively complicated and make the purification more expensive, while the separation effect cannot be considered quite satisfactory.

The special flocculation plants may be avoided, and the purification of the liquid improved by the utilization of the invention, which is characterized by the fact that the contaminated quantity of liquid is passed into a flotation apparatus provided with a dispersion sprayer and that, at least in respect to the substances to be flocculated, substantially pure liquid is mixed with a precipitant and a gas for obtaining a dispersion which is passed through said dispersion sprayer so as initially to come into contact with the contaminated quantity of liquid in the flotation apparatus, flocculi of precipitated contaminations being formed, and the gas supplied together with the precipitant adhering in the form of small air-bubbles to the flocculi formed and lifting the latter towards the surface.

As already mentioned there has earlier been suggested a method of purifying proteinaceous waste water by a flotation process. The purification has taken place in two stages having regard to acid and basic precipitation products, respectively. A similar process may advantageously be accomplished also according to the present invention by combining a plant according to the invention with a previously known device or by combining two devices according to the invention.

Further advantages and characteristics of the invention will appear from the following examples which will be described with reference to the accompanying diagrammatic drawings, in which:

FIG. 1 refers to a device for carrying out the method according to the invention, and FIG. 2 shows a plant in which a device according to the invention has been combined with a previously known device.

The device according to FIG. 1 includes a riser shaft 1, which the liquid to be treated enters through the channel 2. The dispersion plant includes an input of water 3, said water being conveyed by a pump 4 to an air supply device 5, to which air is supplied through a conduit 6. A receptacle 7 contains a precipitant and a substance, acid or base, for the purpose of giving the liquid to be purified a suitable pH-value. The precipitant and said substance are moved by a pump 8 through the conduit 9 to the air supply device 5 for example via the conduit 10 between the pump 4 and said air supply device or through the dashed conduit 9′ to the dispersion holder 11 via the conduit 12 between the air supply device 5 and said dispersion holder 11. In the dispersion holder 11 all the said substances are mixed well into a homogeneous air-liquid dispersion, the air being dissolved in the liquid mixture. At the bottom of the riser shaft 1 a dispersion sprayer 13 is provided.

As already mentioned the untreated water enters the riser shaft 1 through the channel 2. The water is assumed to be proteinaceous and fairly neutral, i.e. a pH-value of approximately 6.5–7. An acid should therefore be added to give the liquid a suitable pH-value, i.e. approximately 4–4.5. The acid for example $H_2SO_4$, is mixed with the precipitant in the receptacle 7. A suitable precipitant is a lignin sulphonic acid product or other cation active substance. In the way described an air-liquid dispersion is produced, which is supplied to the liquid to be floated in the riser shaft 1 through the dispersion sprayer 13. Then flocculi of precipitated contaminations are momentarily produced in the shaft. The dissolved air is transformed by the pressure reduction into small air bubbles 14, which adhere to the flocculi formed in the water, whereby these flocculi are subjected to a lifting force towards the surface. The proteins 15 accumulated in this way at the surface are removed by a scraper 16 or other means and are transported to a collection basin 17. After this first purification process the water 18 has a pH-value of about 4–4.5. The water purified in respect of acid substances is passed through the channel 19 to the next basin for further purification. How this is intended to be carried out will appear in more detail from FIG. 2.

Before the water enters the riser shaft 20 a basic substance, for example NaOH or slaked lime, is added to increase the pH-value to a suitable value on the alkaline side. To obtain a thorough mixture of the added basic substance with the acid water a special precipitation or flocculation takes place. The precipitant consists for example of a neutral salt. Other precipitants are of course also conceivable. One of these is the substance which is on sale under the name of Fixanol.

When the water arrives at the dispersion sprayer 22, accordingly the precipitation is already completed. In the same way as before the precipitate is floated by means of air bubbles 23 in the riser shaft 20. However, the dispersion now consists only of water with air dissolved therein and is produced by passing water through the conduit 24 and air through the conduit 25 to an air/water mixer 26 and further to a dispersion holder 27, in which the air is dissolved in the water. From the dispersion holder 27 the dispersion is conducted to the dispersion sprayer 22 and out into the riser shaft 20. The collection of the floated contaminations is effected in a similar way as before. The pure water is discharged through a channel 28.

The principle of the invention may also be used in the case of purification in respect of both acid and basic substances. The right hand plant in FIG. 2 is then replaced by a plant analogous to the left hand part of the same figure, i.e. by devices according to FIG. 1, whereby the two plants will be connected in series. In stead of acid a base is added in the right hand plant, and instead of a lignin sulphonic acid product or other cation active substance a neutral salt is added. Otherwise the processes are similar.

While the advantages of the invention in connection with the purification of proteinaceous waste water have been set forth and plants for purifying such water by the use of devices according to the invention have been described, it will be understood that the method according to the invention is not limited to this case but may advantageously be used also in other cases, when in a flotation process contaminations present must first be precipitated.

Furthermore it will be possible in purifying proteinaceous waste water first to purify the water in respect of basic substances and then in respect of acid ones, i.e. in the opposite order to that stated in connection with FIG. 2.

Thus, the invention is not limited by the illustrated examples of carrying it into practice but only by the following claim.

I claim:

A method of flocculating a substance present as contamination in a liquid and effecting flotation of the resulting flocculated substance which comprises continuously flowing said contaminated liquid into and maintaining a body thereof in a flotation container, preparing a dispersion consisting essentially of a gas, a precipitant for said substance and uncontaminated liquid, introducing said dispersion directly into said container, mixing said dispersion and said liquid for the first time in said container and separating the resulting flocculated substance from the resulting liquid mixture.

References Cited by the Examiner

UNITED STATES PATENTS

| 1,229,919 | 6/1917 | Ebrill et al. | 260—120 |
| 2,418,311 | 4/1947 | McFarlane et al. | 99—2 |
| 2,793,185 | 5/1957 | Albrektsson et al. | 210—44 |
| 3,179,252 | 4/1965 | Vrablik | 210—44 X |

OTHER REFERENCES

Schwartz, A. M., et al.: Surface Active Agents, 1949, Interscience Publishers, Inc., New York, pp. 111 and 121.

MORRIS O. WOLK, *Primary Examiner.*

MICHAEL E. ROGERS, JOSEPH SCOVRONEK,
*Examiners.*